United States Patent
Hirsch

(10) Patent No.: US 7,047,295 B1
(45) Date of Patent: May 16, 2006

(54) GENERIC ALIGNMENT METHOD IN A MULTIMANAGER ENVIRONMENT

(75) Inventor: Lucian Hirsch, Munich (DE)

(73) Assignee: Siemens Aktiengellschaft, Munich (DE)

( * ) Notice: Subject to any disclaimer, the term of this patent is extended or adjusted under 35 U.S.C. 154(b) by 802 days.

(21) Appl. No.: 10/069,292

(22) PCT Filed: Aug. 18, 2000

(86) PCT No.: PCT/DE00/02827

§ 371 (c)(1),
(2), (4) Date: Feb. 25, 2002

(87) PCT Pub. No.: WO01/15461

PCT Pub. Date: Mar. 1, 2001

(30) Foreign Application Priority Data

Aug. 24, 1999 (DE) ................................ 199 40 048

(51) Int. Cl.
*G06F 15/16* (2006.01)
(52) U.S. Cl. ...................... 709/224; 709/217; 709/218; 709/219; 709/223; 709/224
(58) Field of Classification Search ................ 709/224, 709/232, 234, 236, 217, 218, 219, 223
See application file for complete search history.

(56) References Cited

U.S. PATENT DOCUMENTS

| 5,856,999 A | * | 1/1999 | Robinson et al. | ............ 375/221 |
| H1896 H | * | 10/2000 | Hoffpauir et al. | ............ 455/433 |
| 6,728,688 B1 | * | 4/2004 | Hirsch et al. | .................. 706/11 |

FOREIGN PATENT DOCUMENTS

| DE | 197 52 614 A1 | 6/1999 |
| DE | 19752614 | 6/1999 |
| DE | 198 01 784 A1 | 7/1999 |
| DE | 198 01 785 A1 | 7/1999 |
| DE | 19801785 | 7/1999 |
| EP | 0 621 706 A2 | 10/1994 |
| GB | 2 308 777 A | 7/1997 |
| WO | WO 96/20547 | 7/1996 |

OTHER PUBLICATIONS

XP-000793420; "Alarm Correlation Engine (ACE)" by Peng Wu et al., c. 1998.

* cited by examiner

*Primary Examiner*—Ario Etienne
*Assistant Examiner*—Emmanuel Coffy
(74) *Attorney, Agent, or Firm*—Morrison & Foerster LLP

(57) ABSTRACT

A method and a communications system for data realignment by a management network which has at least two management levels, with data being transmitted for data realignment between at least one agent in one management level and at least one manager in a next-higher management level, relating to spontaneous events. The manager sends one or more request messages to transmit the alarm data to the agent, with the manager transmitting correlation information for association of the respective request with the messages that are subsequently sent by the agent. To reduce the load on both the managers and the agents, the requested data is sent from the agent to the managers, together with the monitoring information inserted into an optional additional field. Filter devices which are inserted between the managers and the agent or agents pass only that data which is to be transmitted to the managers associated with it.

11 Claims, 2 Drawing Sheets

GENERIC ALIGNMENT METHOD IN A MULTIMANAGER ENVIRONMENT

CLAIM FOR PRIORITY

This application claims priority to International Application No. PCT/DE00/02827 which was published in the German language on Aug. 18, 2000.

TECHNICAL FIELD OF THE INVENTION

The invention relates to a method and a communications system for data realignment, and in particular, by a management network which has at least two management levels.

BACKGROUND OF THE INVENTION

The principles of a management network, which are also referred to as TMN principles (TMN: Telecommunications Management Network), define a number of management levels for the management of a communications system (e.g. of a mobile communications system) in which each level has two functions. In the managing system, each level except for the lowest level has a manager function for the level below it. In the managed system, each level apart from the uppermost level has an agent function for the next-higher level.

Fault management is, for example, an important part of TMN management. As a rule, the agent in this case plays the active role, by identifying fault events in good time and accurately to its own management level and by transmitting event reports (for example alarm reports) to the manager of the next-higher level. The transmission of event data from the agent to the manager is not critical, provided there is no disturbance to the communication mechanism between these systems. If the link between the two management levels, e.g. between agent and manager, is no longer ensured for a certain time, the agent must temporarily store the events which have occurred during this interval. This ensures that, once the communications capability has been restored, the manager is first provided as quickly as possible with an overview of the current network state, for example for active alarms in the form of a list. Secondly, the manager can build up a history of the events (event history) with as few gaps as possible, for example a history of both the active alarms and the cleared alarms.

To this end, data realignment is carried out between the agent and manager whenever a new connection is set up after a connection termination or after initialization of the agent or of the manager. All alarm data for active alarms for which faults in the agent have not yet been rectified—identifiable from the fact that they are not identified as cleared alarms—must be made available to the next-higher management level completely and as quickly as possible.

DE 197 52 614 specifies such a method and communications system for dealing with alarms, which describe a basic functionality for the manager for requesting all the alarms from the agent. In this case, the agent sends the active alarms as a sequence of standardized M-EVENT-REPORTS, which are embedded in an M-ACTION request, which is initiated by the manager at the start, and are embedded in an M-ACTION response, which is initiated by the agent at the end. These are generic CMISE-standardized (Common Management Information Service Element) procedures, which are defined in accordance with ITU-T X.710 (ITU-T: International Telecommunication Union—Telecommunication sector). ITU-T X.733 defines the contents of a standardized alarm transmission (alarm report), which is produced in accordance with the M-EVENT-REPORTS services. All the M-EVENT-REPORT which are defined in the course of this M-ACTION are correlated unambiguously for each request by using correlation information. This allows the manager to associate these M-EVENT-REPORTS with a specific request and, furthermore, to distinguish them from other "regular" M-EVENT-REPORTS.

In DE 198 01 785, it is assumed that the alarm data for active alarms is transmitted for alarm data realignment between an agent in one management level and at least one manager in a next-higher management level. Furthermore, the manager sends one or more request messages to transmit the alarm data to the agent, and receives correlation information for association of the respective request with the messages containing the alarm data which are subsequently sent by the agent.

Since the alarm data realignment process is controlled by the manager as a function of at least one parameter sent to the agent, the alarm data realignment for the manager can be configured with respect to the basic functionality. This means that it is no longer essential for the agent to send all the active alarms, but only those which are defined in more detail by the transmitted parameters. This provides the manager with a selection function for a subset from all the alarms. Standardized messages are used for this purpose.

This procedure allows the manager to specifically call those alarms which are particularly critical for the functionality and are thus important to that manager, while in the process significantly reducing the load on the interface to the agent resulting from the information flow, which is restricted to only specific alarms, in comparison to the conventional method in which all alarms are signaled automatically.

In a multimanager environment, the agent must be able to cope with tasks from a number of managers, even at the same time. On the other hand, a manager can carry out its function optimally only when all the relevant events (event reports) are received as quickly as possible from the lower-level agents. In normal conditions, e.g. when the communication between an agent and a manager, or agents and managers, is functioning, this is done by using an event reporting mechanism. In this case, after identifying an event, the agent generates a corresponding message. In addition to the alarm messages, these are, for example, messages or notifications relating to a state change, object creation, object deletion or attribute value changes (attribute value change notification). These messages are sent to event forwarding discriminators, so-called EFDs, which may be located in the agent.

The object of an EFD is to pass on or route to the manager only those reports which satisfy specific filter criteria. The manager has the capability to set up such EFDs in the agent, or to delete them, and to define the filter criteria. Each manager can thus control the information flow in accordance with its individual requirements at any time.

In an object-oriented environment, for example between a manager and an agent in a mobile radio network, each agent functionality is provided by a specific object as an instance in an object class. The object is produced as the result of a modeling activity (definition of an information model), and is known both to the manager and to the agent carrying it out.

As described, there are various situations in which general data realignment is necessary, alarms, states, configuration changes between a manager or managers and an agent or agents, going beyond the normal event reporting mechanism, for example after a connection has been cleared or after initialization of the agent or manager. This alignment is generally started in response to a manager request.

Particularly for use in a third-generation mobile radio system, such as UMTS (Universal Mobile Telecommunications System), an optimum alignment method, which is preferably capable of standardization, between a manager or managers and an agent or agents should satisfy as many of the following criteria as possible:

1. As far as possible, the method should use only standardized services/protocols and be of a generic nature, in order to avoid specific manager and/or agent implementations.
2. At least for the so-called mandatory parameters, the alignment information should include the same contents as the original notification, with this being particularly important for so-called dynamic information, such as alarms or states.
3. If the data realignment is controlled by the manager, the manager should be able to define the alignment start, and should be able to identify the alignment end, without any doubt.
4. The manager should be able to distinguish between an on-line (normal) notification and a notification which is received as a consequence of a previously started alignment procedure.
5. The notifications sent by the agent using the alignment procedure use the same EFDs as the normal notifications.
6. The same log settings as for the normal notifications apply to the notifications which are sent by the agent using the alignment procedure.
7. The manager may request a complete or only a partial alignment method, for example depending on certain parameter values.
8. In a multimanager environment, each manager should receive only those notifications which are sent as a consequence of an alignment procedure triggered by that manager itself, to be precise even when alignment processes are being carried out in parallel by a number of managers.
9. The manager can distinguish between notifications even when a number of its own alignment procedures are being carried out at the same time, for example for different data or network regions.

Until now, there have been two fundamental types of data realignment or alignment methods:

a) The manager sends a request (M-ACTION request in accordance with ITU-T Standard X.710) to the agent, containing the alignment parameters and a unique number. First, the agent sends a so-called start alignment notification—for the correlation of all the notifications sent using the alignment method with the manager request. Then the agent sends the alignment notification to all the EFD instances. The end of the alignment procedure is signaled to the manager by means of a CMISE-standardized M-ACTION response, or by means of a separate end alignment notification (CMISE: Common Management Information Service Element).

This method, which is already used in mobile radio systems, has disadvantages, since non-standardized notifications (start alignment/end alignment) are introduced. Furthermore, in a multimanager environment, the notifications which are sent using a specific alignment process are also disadvantageously received by all the other managers. This results in unnecessary notifications and notifications received more than once. The above criteria 1 and 8 are thus not satisfied.

b) The manager sends a request, a CMISE-standardized M-ACTION request, which contains the alignment parameters, also including the filter criteria for this alignment procedure. In this case, the agent must first determine the notifications which correspond to those criteria. The agent then forms an M-ACTION response with all these notifications, and sends this to the request originator or manager.

This method likewise has disadvantages, since it means a specific implementation, because the agent must first check all the potential notifications in accordance with the filter criteria contained in the M-ACTION request. This leads to the alignment procedure lasting for a longer time. Furthermore, the alignment notifications do not use the same filters with regard to the event report or event reporting (in the EFD) and with regard to the event logging (LOG) as the normal notifications. In consequence, the above criteria 1, 5 and 6 are not satisfied.

SUMMARY OF THE INVENTION

In one embodiment of the invention, there is a system and method of data realignment by a management network having at least two management levels. Alarm data for active alarms is transmitted as, for example, generic alarm data realignment between an agent in one management level and a manager in a next-higher management level.

In one aspect of the method, there is a generic method for carrying out an alignment procedure. This means, in particular, that it is independent of the transmitted information and manager/agent implementations.

No additional notifications that have not yet been defined in the Standards are required. This means simple implementation, compliant with the Standards, in the agent, and simple correlation in the manager between the request and alignment notifications.

Interposition of the filter units between the actual functional units of managers and agents reduces the load on them in favor of their routine tasks. There is no longer any need for autonomous filter functions for associating data realignment data with specific managers, in the managers and agents.

The filter units to be arranged in the output or outlet areas of the agents reduces the loads on the communications network located between the agents and managers, and on the devices located in between them, in a particularly advantageous manner.

The use of optional additional fields, in particular the additional text field, makes it possible to use the existing Standards without any redefinitions. Ideally, all that is required is programming changes to the control software in the managers and agents.

BRIEF DESCRIPTION OF THE DRAWINGS

The invention will be explained in more detail in the following text using exemplary embodiments and with reference to the figures, in which.

DETAILED DESCRIPTION OF THE PREFERRED EMBODIMENTS

Figure 1:
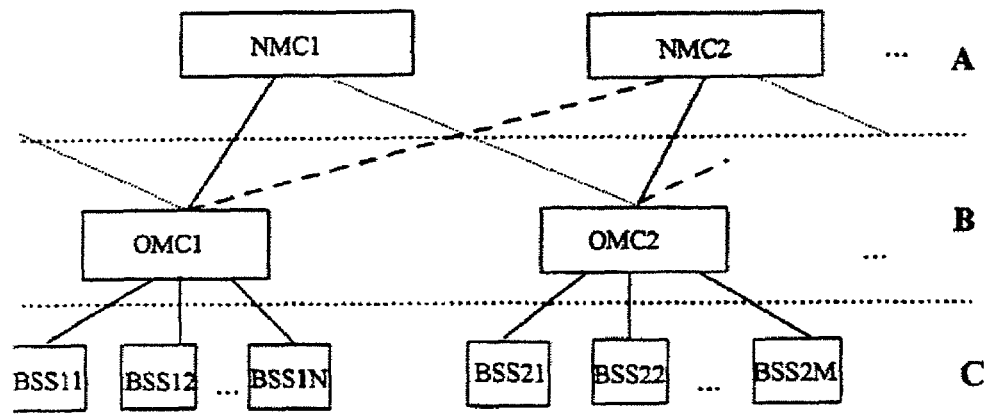
FIG. 1 shows a block diagram of a management network for a mobile communications system with an agent-manager relationship between an operation and maintenance center and one or more network management centers.

The exemplary embodiment describes the invention on the basis of an example of a TMN concept for the management of a mobile communications system which has, by way of example, network elements for a mobile radio network in accordance with the UMTS or GSM Standard. However, the concept is not restricted to mobile radio networks but can be applied to telecommunications networks of any type which use a TMN management network or the like.

A mobile communications system is a hierarchically subdivided system of different network elements, in which the lowermost hierarchy level is formed by the mobile stations. These mobile stations communicate via a radio interface with radio stations which form the next hierarchy level and are referred to as base stations. The base stations, which, for example, supply mobile stations in a radio area of a radio cell, are preferably combined in order to cover a relatively large radio region, and are connected to higher-level network elements, the base station controllers. The base stations and base station controllers are part of a base station system (base station subsystem) in the mobile communications system. The base station controllers communicate via defined interfaces with one or more switching centers, the mobile switching centers, via which handovers to other communications networks are also handled. The mobile switching centers together with a number of databases form the switching system (switching subsystem) of the mobile communications system.

In addition to the above network elements, there are one or more operation and maintenance centers which are used for configuring and monitoring the network elements. Monitoring measures and configuration means are for this purpose generally remotely controlled from the operation and maintenance center, and the operation and maintenance centers are normally arranged in the area of the mobile switching centers. An operation and maintenance center in this case communicates with each base station system or switching system via a defined interface. The operation and maintenance system has the further task of carrying out configuration management which, in addition to fault management, represents one of five management functional areas which identify the TMN principles. Configuration management defines a range of services which allow the structure to be changed, and hence allow the behavior of a telecommunications network to be changed, by the operator. These services always relate to instances of managed objects which, in total, form the network-specific management information base.

A managed object for the purposes of configuration management is a logical abstraction of a resource in the mobile communications system. In this case, a distinction is drawn between hardware-related managed objects, which describe a manufacturer-specific implementation of a function, and function-related managed objects, each of which is the abstraction of a manufacturer-independent functionality.

The TMN principles define a number of levels for the management of the mobile communications system, which is explained in the following text with reference to fault management, and of which levels three are explained in the following text for the present example, with reference to FIGS. 1 and 2.

Figure 2:
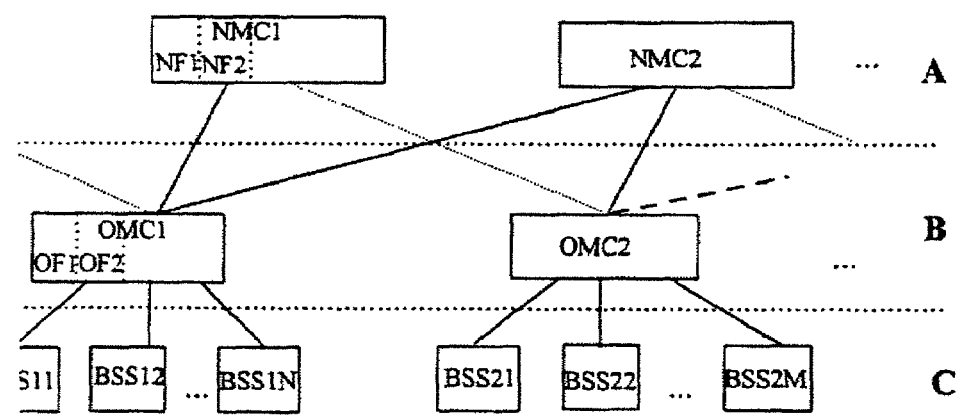
FIG. 2 shows a block diagram of the management network as shown in FIG. 1, with an agent-manager relationship between a base station system and an operation and maintenance center for carrying out at least two applications for the base station system.

FIGS. 1 and 2 each show three levels A, B and C in the management network, of which the management level C includes the network element level with a number of base station systems BSS11, BSS12 . . . BSS1N and BSS21, BSS22 . . . BSS2M. The management level B denotes the network element management level, in which operation and maintenance centers OMC1 and OMC2 each provide the manufacturer-specific management functionality for individual subsystems, such as, in the present example, the operation and maintenance center OMC1 for the base station systems BSS11, BSS12 . . . BSS1N, and the operation and maintenance center OMC2 for the base station systems BSS21, BSS22 . . . BSS2M. The management level A denotes the network management level, in which network management centers NMC1 and NMC2 each provide an integrated management functionality, which is independent of the manufacturer. In this case, a number of network management centers can access the same network element in the next-lower management level B, in the present example the network management centers NMC1 and NMC2 of the next-higher management level C for the operation and maintenance center OMC1 of the next-lower management level B. Defined interfaces are provided for information transmission between the network elements in different management levels.

The difference in the illustrations shown in FIGS. 1 and 2 is that an agent-manager relationship for dealing with alarms for one or more alarm data realignments in FIG. 1 between the operation and maintenance center OMC1 (agent) and a network management center NMC1 (manager), or a number of—physically separated—network management centers NMC1, NMC2 (manager), and in FIG. 2 between the base station system BSS11 (agent) and two different applications OF1 and OF2 (manager) exists in the operation and maintenance center OMC1, or between the operation and maintenance center OMC1 (agent) and two different applications NF1 and NF2 (manager) exists in the network management center NMC1. In order to ensure that there is an overview of the fault situation at all times in the network management centers NMC1, NMC2, the operation and maintenance center OMC1 produces the alarm data, which is stored on the basis of, for example, faults which have occurred within the base station systems BSS11 . . . BSS1N that are being supervised, for active alarms, and sends this data in parallel to both managers on request. This is preferably done after a connection has been cleared, or after initialization of the agent or of the manager. A number of requests may likewise also be sent successively from a single manager, for example the network management center NMC1, to the agent, for example the operation and maintenance center OMC1. FIG. 1 shows the structure for requests, which are transmitted more than once according to the invention, for alarm data realignment, which, in the present example, run in parallel between the management level B, in which the agent in the form of the operation and maintenance center OMC1 is located, and the next-higher management level A, in which the managers of at least two network management centers NMC1, NMC2 are formed.

In order to ensure an overview of the fault situation at all times in the management level B as well, for example in the operation and maintenance center OMC1, the base station system BSS11 produces the alarm data, which is stored on the basis, for example, of faults which have occurred within the base stations and base station controllers which have been supervised, for active alarms, and sends this data in parallel to at least two managers of the operation and maintenance center OMC1 in the form of the different applications OF1 and OF2, which are both carried out by one and the same physical element OMC1. This is likewise preferably done after clearing a connection or after initialization of the agent or of the manager. Serial transmission of requests which are initiated more than once by an individual manager, for example the operation and maintenance center OMC1, to the agent, for example to the base station system BSS11, is likewise possible. Alternatively or additionally, an agent-manager relationship may also exist between the operation and maintenance center OMC1 (an agent) and the network management center NMC1 (manager) for serial interchange of requests and alarm data or for parallel interchange of requests and alarm data for at least two different applications NF1 and NF2 (two managers) in the network management center NMC1. FIG. 2 shows the structure for inventive alarm data realignment processes which take place in parallel between the management level B, in which the managers are located as applications OF1 and OF2, and the next-lower management level C, in which the agent is located.

As soon as an internal interface which is located in the management level C is ready to operate again, a request from the manager or managers results in the alarm data realignment process (also referred to as a realignment procedure or realignment method) being started, with the alarm data realignment process being controlled on a parameter-dependent basis by the manager. In this case, the alarm data realignment process in the present example first starts between the base station system, for example BSS11, and the applications OF1, OF2 in the operation and maintenance center OMC1 in parallel, and then continues in parallel between the operation and maintenance center OMC1 and the higher-level network management centers NMC1, NMC2. At the end of these procedures, the fault situation is updated not only in the OMC but also in the NMC once again. The realignment method can, of course, be restricted to updating of the alarm data between an agent and managers in two immediately adjacent management levels, for example level B and level A.

Figures 3, 4:
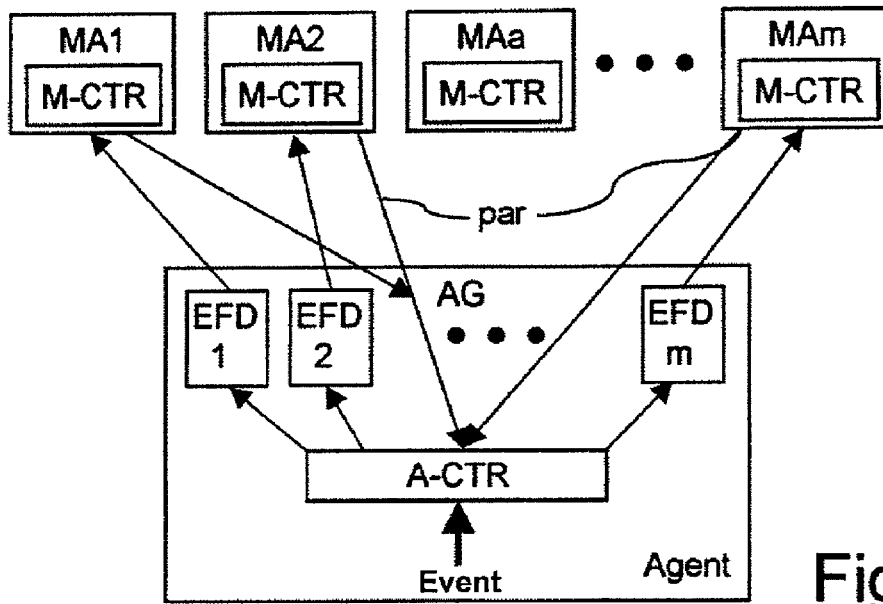
FIG. 3 shows a block diagram of agents and managers for dealing with events for data realignment processes that are carried out in parallel or sequentially.
FIG. 4 shows a message flow between a manager and the agent for controlling the data filtering, using the example of alarms for data realignment.

FIG. 3 shows the layout of an agent AG and manager MA1, MA2, together with the elements which are required to carry out realignment procedures, which take place simultaneously—if there are two or more managers—or in serial form—if there is only one manager. Each manager MA1, MA2 and agent AG has a respective control device M-CTR or A-CTR, which can generate and evaluate the messages for the alarm data realignment process. In addition, they have transmitting/receiving devices—which are not illustrated in any more detail—for transmitting and receiving the messages, as well as memory devices for storing the alarm data and other user and signaling information.

FIG. 3 shows, illustrated schematically, the layout of an agent AG and manager MA1, MA2, together with the elements which are required to carry out realignment procedures, which take place simultaneously—if there are two or more managers—or in serial form—if there is only one manager. Each manager MA1, MA2 and agent AG has a respective control device M-CTR or A-CTR, which can generate and evaluate the messages for the alarm data realignment process. In addition, they have transmitting/receiving devices—which are not illustrated in any more detail—for transmitting and receiving the messages, as well as memory devices for storing the alarm data and other user and signaling information.

In this case, the control devices M-CTR for the managers MA1, MA2 insert into the respective request message for transmission of the alarm data by the agent correlation information which is used to associate the request with subsequently transmitted messages and which is unique, and initiates the transmission to the agent. Furthermore, the devices M-CTR for the managers MA1, MA2 individually insert one or more parameters par into each request message for control of the alarm data realignment process, in order deliberately to request specific alarms, which are identified by different parameter values. The respective request message is sent with the parameters par to the agent AG. The configurable alignment functionality according to the invention for the first time allows, for example, prioritization of the alarms and/or active control of the sequence of the requested alarms to be achieved.

The control device A-CTR for the agent AG receives the corresponding message with the parameters par, evaluates them and starts the realignment for the managers MA1, MA2 by sending back the alarms specifically requested by the managers. In this case, the unique correlation information which the managers MA1, MA2 enter in the request message is used for correlation of the requests, and one message is in each case sent with further correlation information in order to associate the messages (alarm notifications) that are subsequently sent by the agent with the respectively started realignment in the next-higher management level. The further correlation information is also unique. The use of the correlation information allows a unique association of realignment processes which are carried out simultaneously or serially for a number of managers or for a single manager.

In particular, the combination of the basic functionality—use of the correlation information—with the configurable alignment functionality leads to a particularly effective method and communications system. This results in optimum use of the transmission resources on the interface of the agent-manager relationship as well as provision, as quickly as possible, of the alarm data for active alarms which is desired by the manager for the next-higher management level by the agent. Resource utilization, time durations and flexibility are consequently further optimized with respect to the basic functionality in the communications system configured according to the invention. Furthermore, this applies not only to alarm management, but also, in general, to data realignment.

A number of filter functions EFD1, EFD2 (event forwarding discriminators), which can each be associated with the managers MA1, MA2 and can be controlled by them, in the agent AG can optionally also be used with filter criteria for the messages produced by the agent AG. In this regard, the messages with the alarm data are routed to the managers MA1, MA2 when the filter criteria are satisfied. The control device M-CTR for the manager is able to set up and to delete such filter functions in the agent AG and to define the filter criteria, in order to make it possible to control the message flow in accordance with its individual requirements. A situation can thus occur in which the filter function setting differs from one manager to another, so that the realignment procedures, which take place simultaneously, can deal with alarms having different contents and with associated alarm data.

FIG. 4 shows the message flow between an agent AG in the example illustrated in FIG. 1 the operation and maintenance center OMC1 or, in the example illustrated in FIG. 2 the base station system BSS11 —and the manager MA1, MA2 . . . MAn—in the example shown in FIG. 1 the various network management centers NMC1, NMC2, or in the example shown in FIG. 2 the various applications OF1, OF2.

The message flow preferably uses standardized M-EVENT-REPORT messages, which are sent as a consequence of an M-ACTION request initiated at the start. These are generic CMISE-standardized (Common Management Information Service Element) services, which are defined in accordance with ITU-T X.710. ITU-T X.733 defines the content of a standardized alarm transmission (alarm report), which is carried out in accordance with the M-EVENT-REPORT services. Correlation information is entered in the messages, or in specific message fields. The example in FIG. 4 shows the message flow on the basis of individual messages, in which case these can be transmitted in parallel between the agent AG and the managers MA1, MA2, or in serial form between the agent AG and the single manager MA1, as is already known, for example, from DE 198 01 785.

The following features, which are specified in the ITU-T X.721 Standard, are used in particular in the exemplary embodiment described here, for example for an alarm alignment example.

Standardized notifications (alarm notification, state change notification, attribute value change notification, object creation notification, object deletion notification) which may be used for an alignment method includes the additional text as an optional parameter (attribute).

The definition of the additional text parameter (of the GraphicString type, that is to say a character string) includes the following clause:

"Matching terms for equality, substrings". ("MATCHES FOR EQUALITY, SUBSTRINGS").

According to the ITU-T X.722 Standard, this attribute can be tested for the presence of a specific sub-character string (SUBSTRING). The test result may also be used, in particular in EFD or LOG instances, as a filter criterion for those notifications which include this attribute.

The sequence of the example of an alignment procedure will now be explained with reference to the commands that are used.

In normal operation, the preset or default filter setting for each EFD instance in the agent contains the following clause, which is described in the form of plain text here:

<Each notification with the character string "ALIGNMENT" in the additional text field is filtered out>.

The use of this clause in particular allows the EFDs to prevent a manager from receiving those notifications which are sent as a consequence of an alignment procedure initiated by another manager.

Whenever a manager (for example the manager 2) starts an alignment process, it replaces the default filter setting for its EFD instance in the agent by an alignment filter setting in the form of the following clause, which is once again described here in the form of plain text:

<Each notification with the SUBSTRINGS "(aaaa-ALIGNMENT" or "(aaaa-ENDALIGNMENT" in the additional text field is not filtered out>.

where "aaaa" is a number which uniquely identifies that particular manager. This number may, for example, be allocated by the agent whenever a connection is set up to that particular manager.

Whenever the communication between a manager (for example the manager 2) and an agent is set up again, for example after an interruption in the connection, this manager sends a CMISE-standardized M-ACTION instruction with the following parameters to the agent:

| Action type: | * | "requestDataSynchronisation". |
|---|---|---|
| Action information: | * | "Manager-Handling" (managerHandle), for example a previously defined value aaaa). This unique number is used by the agent as a response to this particular manager request for identification of subsequently transmitted notifications. |
| | * | "Alignment-Handling" (alignment-Handle), for example with a value abc. This parameter uniquely identifies that particular alignment process for the manager 2. As the criterion 9 mentioned above specifies, the manager associates the received, alignment-related notifications with the correct alignment process, even when a number of its own alignment procedures are intended to be carried out at the same time. |
| | * | "Datatype" (dataType). This parameter specifies the nature of the data which is intended to be synchronized between the agent and the manager, that is to say, for example, alarms, states or configuration changes. |
| | * | "related units" (relatedEntities) This parameter indicates the network units from which the requested data should originate (for example from a specific network region). |
| | * | "related time interval" (relatedTimeInterval). This parameter specifies the time frame in which the notifications to be sent by the agent originated, for example all alarms between 18:00 and 20:00 hrs. |
| | * | "specific parameters" (specificParameters). Depending on the "data type" (dataType) parameter defined above, specific parameters are defined in this field, for example for alarms with a specific perceived "Severity value" (Severity value). |

After confirmation of the request by means of an "M-ACTION Response", the agent successively sends the relevant notifications to the EFD instances that are present (in accordance with ITU-T Standard X.734). With the exception of the last notification, each notification which is sent for data realignment or alignment contains the character string "(aaaa-ALIGNMENT-abc)", where aaaa and abc have the already explained meanings, at the start of the additional text field.

The last notification sent by the agent of this alignment process contains the character string "(aaaa-ENDALIGNMENT-abc)" at the start of the additional text field.

The separate filter setting of the EFD instance for the manager 2 ensures that the notifications sent by the agent for the alignment can pass through this one discriminator. Even if another manager (manager 1) starts an alignment procedure at the same time with, for example, the unique "alignmentHandle"="bbbb", the manager 2 receives "its" notifications, with the identifier aaaa.

FIG. 4 shows an example of a message interchange between a manager a and an agent for an alarm alignment procedure, with, for example, the "managerHandle" parameter having the value 78, and the alignmentHandle having the value 123, for example.

During the alignment procedure, newly created notifications, which are not sent as a consequence of an alignment procedure that is currently taking place and therefore do not include any special strings, can in principle pass through all the EFD instances (for example notification 3 in FIG. 4), that is to say they can reach all the higher-level managers.

The manager a is also able to identify the end of its alignment procedure, in this case the notification n with the unique identifier "(aaaa-ENDALIGNMENT-abc)".

At the end of the alignment procedure, that is to say after receiving the notification with the SUBSTRING "(aaaa-ENDALIGNMENT-abc)", the manager a resets the default filter setting.

If no alignment is required at the time of the manager request, for example because there are no active alarms, the manager a receives appropriate information in the "M-ACTION-Response" (action reply parameter).

Alternatively, the EFDs may also be a component of the corresponding managers, or of a unit connected between a manager and an agent. This is intended to relieve the manager itself of the load in that the information which is not intended for it is filtered out by the EFD associated with it, before arriving at that manager.

The same procedure can also be used for LOG discriminators or for any other comparable units designed with filter capabilities, or for a component of such units.

The invention claimed is:

1. A method for data realignment using a management network which has at least two management levels, comprising:
    transmitting data for data realignment between at least one agent in one management level and at least one manager in a next-higher management level;
    sending one or more request messages from the manager to the agent requesting the alignment data; and
    transmitting correlation information from the manager to the agent for association of the respective request with the alignment data to be subsequently sent; wherein
    filter devices receiving data independently of the manager and passing the alignment data on the basis of the correlation information solely to the manager requesting the data alignment, the filter devices having a filter setting for filtering out alignment data by using information of an additional field of messages including the alignment data.

2. The method as claimed in claim 1, in which the alignment data is alarm data.

3. The method as claimed in claim 1, in which components of the manager, of the agents or of units connected between a manager and an agent are used as filter devices.

4. The method as claimed in claim 1, in which event forwarding discriminators, log discriminators or other units with filter capabilities are used as filter devices.

5. The method as claimed in claim 1, in which the filter setting of the manager requesting data alignment is reset to the default filter setting after data alignment.

6. The method as claimed in claim 1, in which agents inserts the correlation information into an additional field of message including alignment data before sending the messages to the filter devices.

7. A communications system having a management network which has at least two management levels, comprising:
    an agent for transmitting alignment data to a manager in a next-higher management level;
    a manager for transmitting correlation information to the agent for association of a request with the alignment data to be subsequently sent, and for receiving the alignment data from the agent;
    filter device for receiving data independently of the manager and passing the alignment data on the basis of the correlation information solely to the manager requesting the data alignment, the filter devices having a filter setting for filtering out alignment data by using information of an additional field of messages including alignment data.

8. The communications system as claimed in claim 7, in which devices for defining the filter setting of the filter devices are provided in the manager.

9. The communications system as claimed in claim 7, in which devices for inserting the correlation information into an additional field of messages including alignment data before sending the messages to the filter devices are provided in the agent.

10. The communications system as claimed in claim 7, in which components of the manager, of the agents, or of units which are connected between the manager and the agent are used as filter devices.

11. The communications system as claimed in claim 7, in which event forwarding discriminators, log discriminators or other units with filter capabilities are used as filter devices.

* * * * *